May 21, 1963　　　J. E. HANCOCK　　　3,090,139
TWO-WHEELED SCRAPER
Filed Oct. 5, 1961　　　　　　　　　　　　4 Sheets-Sheet 1
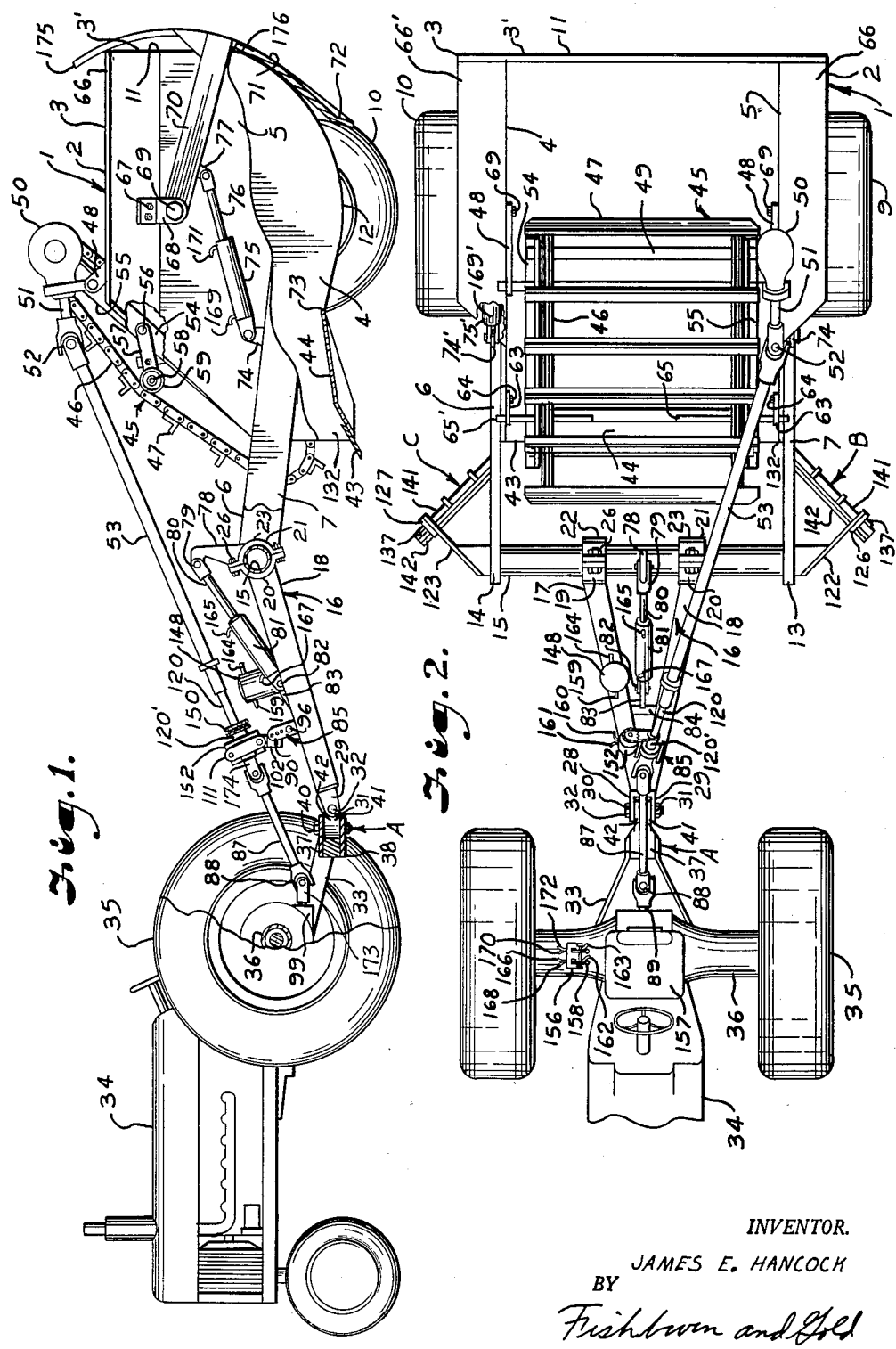
INVENTOR.
JAMES E. HANCOCK
BY
Fishburn and Gold
ATTORNEYS

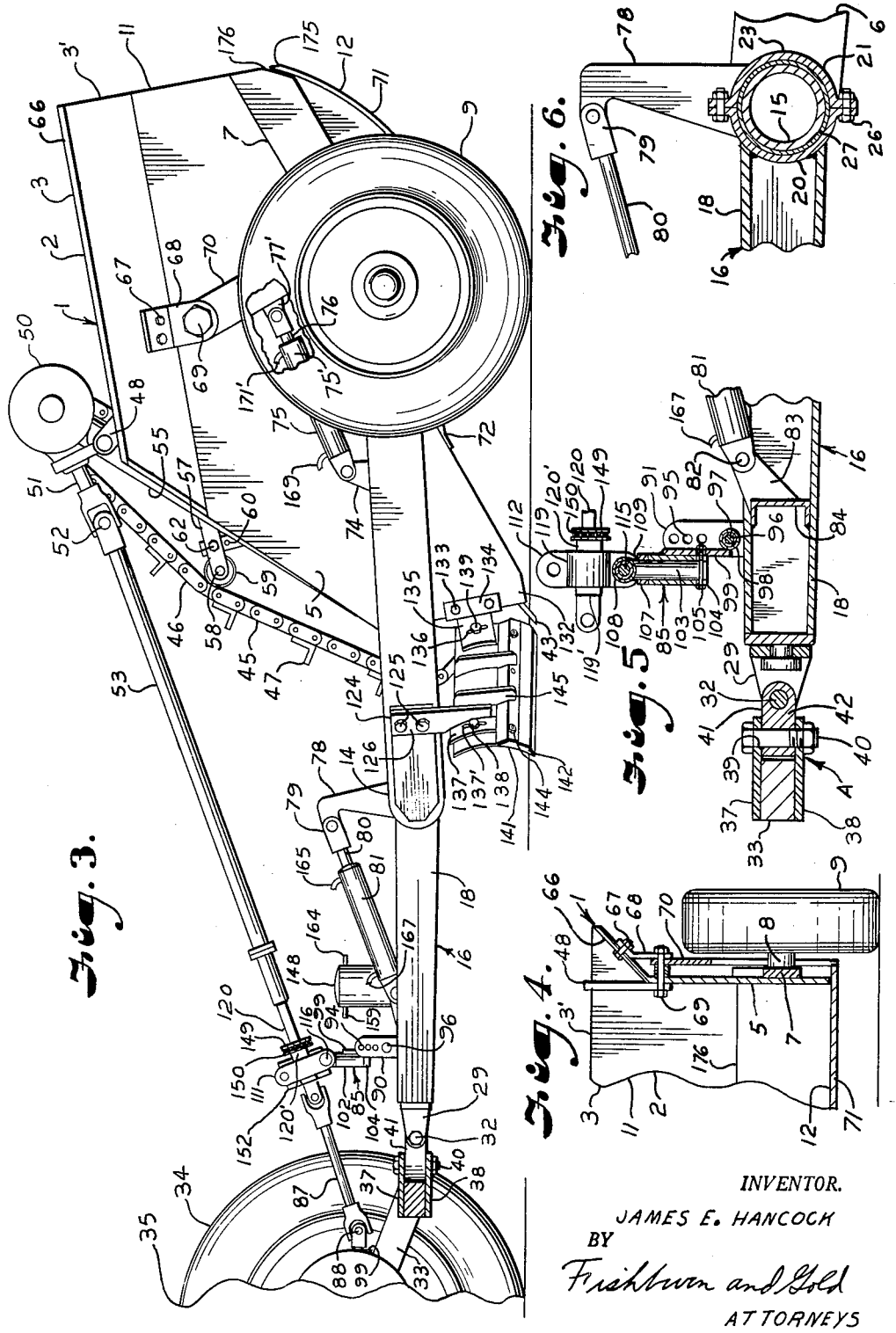

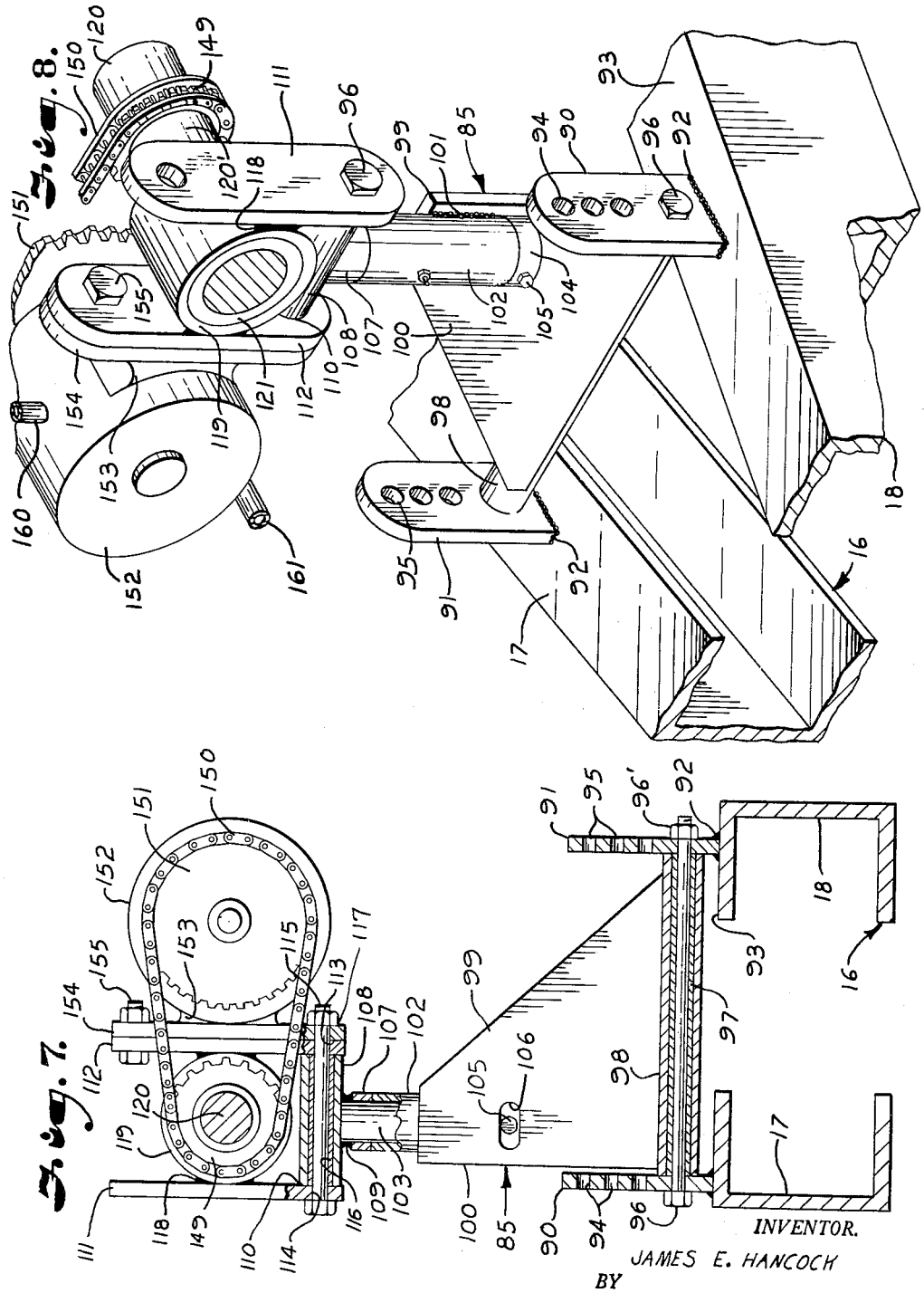

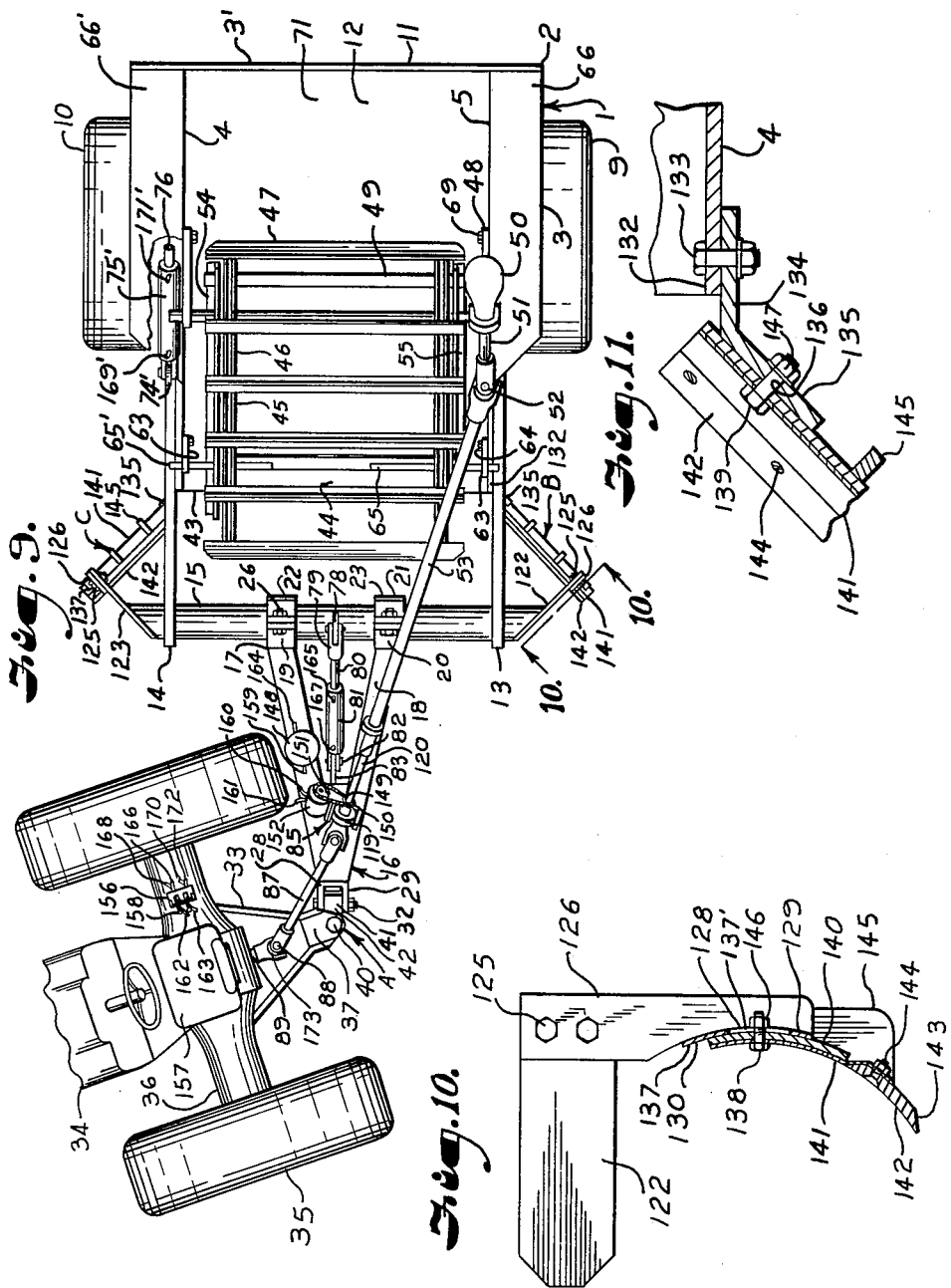
May 21, 1963   J. E. HANCOCK   3,090,139
TWO-WHEELED SCRAPER
Filed Oct. 5, 1961   4 Sheets-Sheet 4
INVENTOR.
JAMES E. HANCOCK
BY
*Fishburn and Gold*
ATTORNEYS United States Patent Office 3,090,139
Patented May 21, 1963

3,090,139
TWO-WHEELED SCRAPER
James E. Hancock, % Hancock Manufacturing Company,
P.O. Box 1359, Lubbock, Tex.
Filed Oct. 5, 1961, Ser. No. 143,114
10 Claims. (Cl. 37—8)

This invention relates to wheeled elevating scrapers, and more particularly to a two-wheeled scraper wherein the bowl or box fills at its front end and dumps through the bottom thereof.

This invention further relates to elevating scrapers having a conveyor for moving dirt into the box somewhat similar to the conveyors in my Patents Nos. 2,791,041 and 2,931,451.

Various attempts have been made to devise wheeled scrapers for moving earth material, but most of such devices wherein two wheels are employed for the scraper pick up the dirt from the open front end and release the same through the rear end by raising of an end-gate and tilting the front end upwardly on the axle of the device so the dirt slides from the box. Such devices usually require a front gate for closing while transporting.

The principal objects of the present invention are to provide a two-wheeled scraper having a frame tiltable on the axles of the wheels to lower the cutting blade to the ground and having a movable bottom for the box to contain the dirt wherein the bottom swings rearwardly and upwardly behind the rear endgate so that the dirt falls through the open bottom of the box.

Other objects of the present invention are to provide a device of this character adapted to be drawn by prime movers, such as a tractor or the like, having a load carrying box tiltably mounted on the wheels of the frame structure of the box and the conveyor being driven by the power take-off of the tractor through a double rotating line bearing; to provide a tongue having one end secured to the frame of the box of the scraper and the other end secured to a draw bar of the tractor; to provide hydraulic means for tilting of the frame of the scraper including the blade to dirt pick-up position; to provide a movable bottom for the box of the scraper; and to provide hydraulic means for moving the bottom rearwardly and upwardly behind the endgate of the box to dirt unloading position.

Still further objects of the present invention are to provide a drive line bearing from the power take-off of the tractor to the conveyor of the scraper for operating the conveyor; to provide the drive line with telescopic parts and with universal joints of the double rotating drive type; to provide an hydraulic pump and a fluid supply means for supplying hydraulic power to tilt the frame on the wheels to lower and raise the scraper blade and to open and close the door opening in the box.

Other objects of the present invention are to provide a cutting blade on the front part of the frame of the scraper and a partial bottom in the box adjacent the blade; to provide cutting wings attached to the frame in front of the wheels of the scraper and extending outwardly at an angle thereto; to provide means for adjusting the wings in a vertical direction; to provide means for removal and replacement of the wings and to provide a device of this character, simple and economical to manufacture.

Other objects and advantages of this invention will become apparent from the following description taken in connection with the accompanying drawings wherein are set forth by way of illustration and example certain embodiments of this invention.

FIG. 1 is a side partly fragmentary and partly cross-sectional view particularly illustrating my elevating scraper and the box shown in transporting position with the bottom elevated rearwardly when the dirt is dumped from the box.

FIG. 2 is a top plan view of the scraper.

FIG. 3 is a side view slightly elevated, particularly illustrating the wings for the scraper.

FIG. 4 is an enlarged diagrammatic cross-sectional view particularly illustrating the mounting of the movable door.

FIG. 5 is an enlarged fragmentary cross-sectional view particularly illustrating the pivotal connection of the tongue with the draw bar of the tractor.

FIG. 6 is an enlarged fragmentary cross-section through the cross member of the frame particularly illustrating the mounting of the tongue thereon.

FIG. 7 is an enlarged cross-sectional view particularly illustrating the support of mounting for the drive line bearing and the pump for the hydraulic system.

FIG. 8 is an enlarged fragmentary perspective view of the mounting of the drive line bearing and the pump for the fluid system.

FIG. 9 is a top plan view shown with the tractor in turning position.

FIG. 10 is an enlarged cross-sectional view taken on a line 10—10, FIG. 9.

FIG. 11 is an enlarged fragmentary cross-sectional view particularly illustrating the mounting of the cutting wings.

Referring more in detail to the drawings:

1 designates a scraper embodying the features of my invention including a framework 2 consisting of a box 3 with a closed rear end 3' having sides 4 and 5 and side members 6 and 7. The side members carry axles 8 on each side of the framework structure for wheels 9 and 10, the wheels being mounted substantially at the longitudinal center of the box 3 and the framework including the box being tiltably mounted on the axles 8. The box includes a rear end 11 and an open bottom portion 12.

Extending between the forward ends 13 and 14 of the side members 6 and 7 and secured to a tubular cross member 15 is a tongue 16 having spaced rearwardly and outwardly extending arms 17 and 18. Rigidly secured to the rear ends of the arms 17 and 18 are one-half sections 19 and 20 of collars 21 and 22, the other one-half sections 23 and 24 closing around the tubular cross member 15 and secured thereto by bolts, as indicated at 25 and 26. Sleeve bearings 27 (FIG. 6) are shown engaged between the collars 21 and 22 and the tubular cross member 15 to permit easy movement of the tongue with respect to the cross member and lowering of the front end of the box to the ground.

The tongue 16 is secured to the tractor hitch indicated generally at A. Rigidly secured to the forward end of the tongue 16 are spaced ears 28 and 29 having aligned openings 30 and 31 for receiving a bolt or the like 32 for attachment of the tongue to the draw bar 33 of the tractor 34 having the usual wheels 35 and axle 36. The draw bar 33 includes spaced ears 37 and 38 having aligned openings 39 for a pin 40 for engaging a bearing member 41 having an ear or arm 42 (FIG. 5) for engaging the bolt 32 so that the tongue may move laterally with respect to the draw bar of the tractor as well as vertically and when the tractor and scraper is moved over uneven ground and also when the scraper is in dirt digging position, as shown in FIG. 3.

Secured to the sides 4 and 5 of the framework structure and forwardly of the wheels 9 and 10 is a scraper blade 43 extending between the sides and transversely thereof. Also extending transversely of the sides adjacent the blade 43 is a partial bottom 44 spaced from the rear end 11 and to which the blade 43 is also secured, as illustrated in FIG. 1.

Mounted in the front end of the frame of the box structure is a conveyor element 45, the construction and operation of which is substantially the same as that disclosed in my Patent No. 2,988,832 wherein the conveyor moves the chains 46 and the flight 47 thereon rearwardly and upwardly on the lower run of the said conveyor whereby it rakes dirt from the scraper blade 43 rearwardly into the box 3, the forward lower end of the conveyor being suitably supported, whereby it will float upwardly on earth being moved over the scraper blade but its downwardly movement is limited so that the flights will pass over the scraper blade in closely spaced relation thereto. The upper end of the conveyor is pivotally mounted by arms 48 to the sides 4 and 5 of the mechanism at its upper end and travels over a shaft 49, one end of which engages in a gear box 50 having suitable gearing connecting with a shaft 51 and universally connected at 52 to a telescoping drive shaft line 53, the shaft 51 being connected to the gearing in gear box 50 which in turn drives the shaft 49 for driving the conveyor 45. While I have here shown the drive shaft line connected to the gear box at one end of the shaft 49, it may be connected to the center thereof.

On each side of the conveyor 45 are angle members 54 and 55 to which are pivotally attached by bolts 56, arms 57 in the outer ends of which are mounted a shaft 58 carrying idler pulley 59 for engaging under the chains 46 to tighten the same. Vertically extending arms 60 are secured to the vertically extending portions of the angle member 54 having a plurality of openings 61 for receiving a pin 62 which provide for adjustment of the idler pulleys 59.

The lower end of the conveyor 45 is pivotally and floatingly mounted by arms 63 pivotally mounted to the sides of the frame by bolts or the like 64, as illustrated in FIG. 2. The outer ends of the arms 63 carry short shafts 65 having their outer ends 65' extending over the side members 6 and 7 to act as a stop for the forward end of the conveyor.

The top of the sides 4 and 5 include upwardly and outwardly extending extensions 66 and 66' in order that the box will hold a maximum amount of dirt or other material. Secured to the underneath side of the outwardly extending portions 66 and 66' by bolts or the like 67 are bracket arms 68 to which are pivotally mounted by bolts 69, arms 70 having their outer ends rigidly secured to a bottom or door member 71 for closing the open bottom 12. The bottom 71 is curved, as illustrated in FIG. 1, and has its forward end edge extended slightly at an angle, as indicated at 72 and when the door is closed the forward end thereof will engage under the edge 73 of the partial bottom 44 as shown in FIG. 1. Secured to the side members 6 and 7 and extending upwardly therefrom are bracket members 74 and 74' to which are pivotally mounted hydraulic cylinders 75 and 75' having piston rods 76 with their outer ends pivotally mounted to ears or lugs 77 on the arms 70 also as illustrated in FIG. 1 for movement of the bottom door 71 to open and closed position as later shown.

The tubular cross member 15 has an upstanding bracket arm 78 near the center, the upper end of which is pivotally mounted to the free end 79 of a piston rod 80 of an hydraulic cylinder 81 having its end opposite the piston pivotally mounted, as indicated at 82 to a bracket arm 83 rigidly secured to a cross arm 84 between the arms 17 and 18 of the tongue 16, as illustrated in FIG. 2 for raising and lowering of the scraper blade with respect to the ground as will later be shown.

The lower end of the telescoping drive line or drive shaft 53 has a support or mounting 85 and is universally connected at 86 to a shaft 87 universally connected at 88 to the power take-off 89 of the tractor 34.

The support 85 includes upstanding brackets 90 and 91 rigidly secured by welding or other suitable means, as indicated at 92 to the upper sides 93 of the arms 17 and 18 of the tongue 16 and has a plurality of spaced openings 94 and 95 for receiving a shaft or bolt 96 engaging in a bearing member 97 of a sleeve member 98 secured between the upstanding brackets 90 and 91. A lock nut 96' secures the bolt in the bearing 97. Rigidly secured to one side of the sleeve member 98 is a plate 99 to the side 100 of which is secured by welding, as indicated at 101, a vertically extending tubular bearing member 102 for receiving a vertical shaft 103. The shaft 103 extends through the lower end of the bearing 102 and a collar 104 engages thereover and is held thereon by a bolt 105 extending through aligned openings therein and through the lower end of the shaft 103 (not shown) an opening 106 is provided in the plate 99 for access to the bolt 105. A spacer 107 is provided on top of the bearing 102 and one side of a sleeve 108 is rigidly secured to the top of the shaft 103 by welding, as indicated at 109 (FIG. 7), the sleeve being transversely to the top of the shaft 103 and horizontally thereof. The sleeve 108 has its ends 110 engaging against the vertical plates 111 and 112, the lower ends of which have aligned openings 113 and 114 for a shaft or bolt 115 mounted in a sleeve bearing 116. The bolt 115 has one end threaded for receiving a nut 117.

Mounted between the plates 111 and 112 and rigidly secured thereto, as indicated at 118, is a bearing housing 119 for the telescoped portion 120 of the telescoping shaft or drive line 53, the shaft 120 having a sleeve bearing member 121 in which said shaft rotates. Collars 119' and 120' are provided on each side of the bearing housing 119 to prevent longitudinal movement of the shaft in the bearing 121.

Rigidly secured to the front ends 13 and 14 of the side members 6 and 7 are wing blade members B and C and include brackets 122 and 123 having their rear ends turned slightly outwardly as indicated at 124 and secured thereto by bolts 125 are depending arms 126 and 127, the forward lower portions of which are curved as indicated at 128 (FIG. 10) and rigidly secured to each arm by welding or other suitable means as indicated at 129, is a moldboard assembly 130. As the moldboard assemblies are the same only one will be described.

Mounted on the forward portion 132 of the sides 4 and 5 of the framework structure by bolts or the like 133 is an inner mounting member 134 for the moldboard blade assembly 130. Only one mounting member will be described and each includes an outwardly extending bracket 135. The bracket 135 includes a vertical slot 136 and the moldboard 130 includes a plate 137 having a vertical slot 137' to which the moldboard assembly is adjustably secured by bolts 138 and 139. A support member 140 is provided between the blade 141 and the plate 137 and the bolts 138 extend therethrough to secure the blade 141 to the assembly. A removable blade portion 142 is provided on the lower edge of the blade 141 and is sharpened as indicated at 143. The blade portion 142 is secured to the blade 141 by bolts or the like 144 (FIG. 10). Stiffening or brace members 145 are provided on the back of the assembly, as illustrated in FIG. 3. The blade portion 142 is removable by removing the bolts 144 for replacement or sharpening, and the moldboards are adjustable vertically by loosening of the nuts 146 and 147 on the bolts 138 and 139 respectively. The removable wings for attachment to the scraper forwardly of the wheels, as above described, will serve the purpose of maintaining the cut of the ground in a vertical direction and is particularly usable in the making of silos or in cutting close to grade stakes in various operations. The scraper may be used with or without the wings as desired. Probably most operations will be without the wings. It will be seen in FIGS. 2 and 9 the wings extend to about even or slightly outwardly of the wheels 9 and 10 of the scraper.

A supply of fluid for operation of the hydraulic cylinders is provided in the tank or container 148 mounted upon the tongue, as indicated in FIGS. 2 and 9 and particularly on one of the arms here illustrated to be arm 17. Mounted upon the shaft 120 (FIG. 8) is a sprocket 149 having a chain 150 leading to a sprocket 151 for operating a pump enclosed within the pump housing 152 (FIG. 8) which is secured, as indicated at 153 to a plate 154 which in turn is secured to the plate 112 by a bolt 155 at its upper end and by the bolt 115 at its lower end (FIG. 7).

Instead of the chain and sprockets here shown, V-belts and pulleys may be used for operating the pump.

It is to be understood that the fluid supply container and pump mounted upon the scraper itself is to be utilized only when the tractors are not equipped with hydraulic systems where such tractors do have the hydraulic fluid system, then the pump and containers are not necessary for furnishing hydraulic power to lift and dump the scraper and for lowering the blade to earth digging position. The hydraulic system just above described is for use on scrapers to be drawn by old style tractors. In such instances the utilization of a pump is necessary.

A control box 156 is mounted upon the tractor (FIG. 2) within reach of the operator of the tractor from the seat 157 and includes levers 158. The fluid system includes a line 159 leading from the supply tank 148 to the pump as indicated at 160 (FIG. 2). A line 161 leads from the pump to the control box as indicated at 162 and a line 163 leads from the control box to the supply tank 148, as indicated at 164.

For operation of the cylinder 81, a line 165 is connected to one end thereof which leads to the line 166 in the control box and a line 167 leads from the other end of the cylinder to the control box, as indicated at 168. A line 169 leads from one end of the cylinder 75 to the control box as indicated at 170. Line 169 has a branch line 169′ leading to the same end of cylinder 75′. A line 171 leads from the other end of cylinder 75 to the control box as indicated at 172. Line 171 has a branch line 171′ leading to the same end of cylinder 75′ so that cylinders 75 and 75′ will operate simultaneously to raise and lower the door 71 of the box 3.

It will be obvious that since the drive of the conveyor element 45 is from one side thereof as indicated by the gear box 50 through the telescoping drive line shaft 53 said shaft is at an angle to the power take-off mechanism when the device is in a straight line forward position as shown in FIG. 2.

One of the important features of the present invention is the double rotating drive line bearing which allows for the tractor to be turned to approximately 80° angle as shown in FIG. 9. In order to accomplish this I preferably show the shaft 87 of approximately two feet in length and the tractor hitch A is substantially even with the longitudinal center of the shaft 87. The angle of the U-joints 86 and 88 of the shaft 87 will be at an angle to their connection with the power take-off connection 173 and the connection 174 with the shaft 120 at an angle of approximately 40°. In other words, the angle of the U-joints will be approximately one-half of the angle of the tractor to the scraper, also as illustrated in FIG. 9. Assuming the tractor could be turned 90° with respect to the scraper the angle of the U-joints would be 45°. During the turning of the tractor the hitch will rotate transversely in its connection with the tongue and at the time the U-joints 86 and 88 are moving, the shaft 87 will move rearwardly because of the angle of the tongue with respect to the draw bar of the tractor and through its connection with shaft 120 the mounting for the bearing housing 119 will rock on an axis transversely of the tongue so as to compensate for the turning of the tractor and to relieve strain on the shaft 87 during such turning. The bearing mounting rotating or rocking on the bolt or shaft 96 (FIGS. 7 and 8) the same results will be accomplished when the tractor is turned to the left or in the opposite direction shown in FIG. 9. With this short line drive next to the tractor power take-off and each U-joint turning at a 45° angle or less, it is possible to accomplish sharp turns with the tractor not heretofore possible with a pump attached to the drive line.

When the tractor is moving on uneven ground in a forward direction there will also be rocking of the bearing housing 119 and pump on the bolt or shaft 115 which will be substantially a rotation on a horizontal axis. The bearing housing and the drive line shaft 53 may also rotate transversely on a vertical axis through the shaft 103. The plurality of openings 94 and 95 in the brackets 90 and 91 are provided to take care of differences in location of the power take-off of the tractor and a draw bar thereon and also the differences in the distance of the draw bar or tractor hitch from the ground.

In operation of a scraper including the fluid supply and pump herein illustrated, manipulation of one of the controls on the control box 156 will cause the pump to flow fluid from the tank through lines 165 to the cylinder 81 to cause the piston therein to retract the piston rod 80 to cause the forward tilting of the frame and box of the scraper on the wheels thereof to cause the blade 43 to engage the ground to loosen the dirt so that the conveyor will move it into the box 3. When the scraper is in loading position the bottom 71 will be closed as shown in FIG. 3. When in this position the forward edge 72 of the door will engage under the edge of the partial bottom and the rear edge 175 will engage the beveled lower corner 176 of the box, as illustrated in FIG. 3. When the box is loaded manipulation of the controls on the control box will cause the fluid to flow through lines 159 from the tank to the opposite end of the cylinder 81 through line 167 to extend the distance thereof as shown in FIG. 1 to raise or tilt the forward end of the box on the axles of the frame to transporting position.

When it is desired to dump or unload the box manipulation of the control lever will cause the pump to flow fluid through lines 171 and 171′ to the cylinders 75 and 75′ to extend the pistons 76 therein which are attached to the arms 70 of the swinging door 71 to raise the same to the position shown in FIG. 1 which will allow the dirt to fall from the box through the open bottom 12 thereof. When the door 71 is being opened it is in close proximity to the beveled portion 176 of the rear lower corner of the box so that any dirt or sticky material remaining on the inside of the door will be scraped therefrom as the door is opened. The cylinders 75 and 75′ are provided one on each side of the box of the tractor to provide even movement of the door and thus prevent binding of the same when it is moved to an open and closed position.

It will be obvious that the scraper may be used without the pump and fluid supply mounted thereon but may be operated from the fluid supply of the tractor when the tractor has such fluid system.

When it is desired to use the wings B and C to cut a wider swath or to dig a trench or ditch having substantially vertical side walls, the wings B and C may be attached to the scraper by the bolts 125 to secure the depending brackets 126 to the side members 6 and 7 by fastening the inner mounting 134 to the bolts 133 to the side frame of the box. The moldboard assembly may be adjusted vertically by the bolts 138 and 139 moving in slots 136 and 137′ on the plate 137 and bracket 135. The wings and cutting blades thereon may be adjusted at an angle vertically with respect to the blade 43 if desired so that a slight incline may be provided on the surface of the trench being dug. The moldboard is of a shape which will cause the dirt loosened by the blades on the wings to move the same inwardly toward the scraper blade to be picked up by the conveyor 45 and moved into the box 3.

It will be obvious from the foregoing that I have provided an improved two wheeled elevating scraper having an hydraulic pump and supply tanks mounted thereon operable from the power take-off of the tractor for furnishing hydraulic power to tilt the box on the scraper and to open and close the bottom door thereof, to provide the double rotating drive line bearing and to provide vertically adjustable wings attached to the scraper in front of the wheels for making a wider cut in the ground than that supported by the scraper blade and which will move the loosened dirt in toward the conveyor where it is moved into the box.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a mobile scraper, the combination of a frame with an open front dirt collecting box on said frame, said frame having side members and a cross member at its forward end and said box having a rear end, wheel supports for said frame, means carried by said frame pivotally mounting said frame on said wheel supports for tilting movement in a vertical plane, said box having side walls and a fixed bottom plate between the side walls spaced from the rear end of the box leaving a door opening in the box rearwardly of said plate, a door for closing said opening, means swingingly mounting said door on said side walls of the box, a scraper blade carried by said frame and extending transversely of the dirt collecting box, wing members secured to the outer ends of said cross member and said side walls forwardly of said blade, said wing members having a moldboard and a cutting blade on the lower portion thereof extending at an angle forwardly at their outer ends, means for adjusting the vertical position of said cutting blade with respect to the scraper blade, fluid operated means for tilting said frame to lower said scraper blade to digging position and to raise the same to dirt transporting position, and fluid operated means for swinging said door to open and close the said door opening in the bottom of said box, the dirt being removed from said box without tilting said frame.

2. In a scraper for attachment to a tractor having a hitch and a power take-off, the combination of, a frame with an open front dirt collecting box on said frame, said frame having side members and said box having a rear end and a cross member at its forward end, wheel supports for said frame, means carried by said frame pivotally mounting said frame for tilting movement in a vertical plane, said box having side walls and a fixed bottom plate between the side walls spaced from the rear end of the box leaving an opening in the box rearwardly of said plate, a door for closing said opening, means swingingly mounting said door on said side walls of the box, a scraper blade extending transversely of the dirt collecting box adjacent the forward edge of said bottom plate, a conveyor mounted on said frame for moving dirt from said scraper to said dirt collecting box, wing members secured to the outer ends of said cross member and said side walls forwardly of said blade, said wing members having a moldboard and a cutting blade on the lower portion thereof extending at an angle forwardly at their outer ends, means for adjusting the vertical position of said cutting blade with respect to the scraper blade, fluid operated means for tilting said frame to lower said scraper blade to digging position and to raise the same to dirt transporting position, and fluid operated means for swinging said door to open and close the said door opening in the bottom of said box, means operable by the power take-off of the tractor for rotating said conveyor.

3. In a mobile scraper for attachment to a tractor having a hitch and a power take-off, the combination of, a frame having a cross member at its forward end, wheel supports for said frame, said frame having a dirt collecting box thereon with a rear end and an open front, means carried by said frame pivotally mounting said frame for tilting movement in a vertical plane, said box having side walls and a fixed bottom plate between the side walls spaced from the rear end of the box leaving an opening in the box rearwardly of said plate, a door for closing said opening, means swingingly mounting said door on said side walls of the box, a scraper blade extending transversely of the dirt collecting box adjacent the forward edge of said bottom plate, a conveyor mounted on said frame for moving dirt from said scraper to said dirt collecting box, rearwardly and outwardly extending arms rigidly secured to the respective ends of said cross member, depending brackets attached to said arms, bracket members secured to each of said side walls of the frame, a moldboard, said moldboard extending at an angle forwardly with respect to said scraper blade, means for vertical adjustment of the moldboard on said depending brackets and said bracket members, cutting blades attached to said moldboard whereby the dirt cut by said cutting blades will be moved toward said scraper blade, fluid operated means for tilting said frame to lower said scraper blade to digging position and to raise the same to dirt transporting position, fluid operated means for swinging said door to open and close the said door opening in the bottom of said box, and means operable by the power take-off of the tractor for rotating said conveyor, said dirt being removed from said box without tilting said frame.

4. A two-wheeled scraper adapted to be attached to a hitch of a tractor having a power take-off comprising, a frame with an open front dirt collecting box on said frame, said frame having side members and having side walls on said frame and a rear end, axles for said wheels carried by the frame approximately midway of said box, a fixed bottom plate between said side walls spaced from said rear end of the box providing a door opening in the bottom of said box, a door for closing said door opening swingingly mounted on said side walls, means for swinging said door for opening and closing said door opening, a scraper blade extending transversely of the dirt collecting box adjacent the forward edge of said plate, a conveyor mounted on said frame having a transverse shaft at its upper end, said side members extending forwardly of said box, a tubular cross member secured to the forward ends of said side members, a tongue, means connecting one end of said tongue to said cross member for rotating about said cross member, the other end of said tongue being pivotally connected to the tractor hitch, an upstanding bracket rigidly attached to said cross member, fluid operated means having one end pivotally attached to said bracket spaced from said cross member and its other end pivotally attached to said tongue spaced from said cross member for tilting said frame to lower said scraper blade to digging position and to raise the same to dirt transporting position, a universally connected telescoping line drive having one end connected to the power take-off of the tractor and its other end to the transverse shaft of said conveyor for rotating said conveyor to move the dirt from the scraper blade into the box, and means on said tongue supporting said telescoping line drive, said means including a bearing member for the line drive, a horizontal shaft mounted transversely of said tongue, a bearing member for said horizontal shaft, a vertical bearing member rigidly secured to said bearing member for said horizontal shaft, a shaft in said vertical bearing rotatable about the axis thereof, a bearing member rigidly secured to the upper end of said vertical shaft, a shaft in said last-named bearing member, spaced vertically extending plates rotatably mounted on said last-named shaft having their facing sides rigidly secured to the bearing member on said line drive for the conveyor whereby when the tractor is turned with respect to the scraper said line drive may move longitudinally with respect to said tongue due to rotation of the bearing member on said first-named horizontal shaft on said tongue.

5. In combination with a mobile elevating scraper having a tongue for attachment to a tractor having a hitch for the tongue and a power take-off, said scraper having a conveyor having a transverse shaft at its upper end for moving loosened dirt into said scraper, and a drive line shaft universally connected at its upper end to the transverse shaft on said conveyor, said drive line shaft having a short shaft having one end universally connected to the lower end of said drive line shaft and its other end universally connected to said power take-off, a support for said drive line shaft, said support including upstanding spaced arms on said tongue, a first shaft supported in the upper ends of said arms, a first bearing member for said shaft, a vertical shaft, means securing said vertical shaft to said first bearing member, a second bearing member rigidly secured to the upper end of said shaft, a second shaft in said second bearing, spaced plates rotatably mounted on said second shaft, a sleeve bearing mounted on said second shaft, a sleeve bearing rigidly mounted between said plates through which said drive line shaft extends whereby a double rotating bearing is provided for said line so that when the tractor is turned said vertical shaft will rock on said first shaft to allow said short shaft to turn at one half the angle of the angle of the tractor to said scraper.

6. In a mobile scraper, the combination of a frame with an open front dirt collecting box on said frame, said frame having side members and a cross member at its forward end and said box having a rear end, wheel supports for said frame, means carried by said frame pivotally mounting said frame on said wheel supports for tilting movement in a vertical plane, said box having side walls and a fixed bottom plate between the side walls spaced from the rear end of the box leaving a door opening in the box rearwardly of said plate, a door for closing said opening, means movably mounting said door on said box, a scraper blade at the forward end of said bottom plate and extending transversely of said dirt collecting box, wing members secured to the outer ends of said cross member and said side walls forwardly of said scraper blade, said wing members having a mold board and a cutting blade on the lower portion thereof extending at an angle outwardly and forwardly of said side walls, means for adjusting the vertical position of said cutting blade with respect to the scraper blade, means for tilting said frame to lower said scraper blade to digging position and to raise the same to dirt transporting position, and means for moving said door to open and close said door opening in the bottom of said box for removal of the dirt.

7. In combination, a mobile elevating scraper having a tongue and a tractor having a hitch for attachment of the tongue, said tractor having a power take-off, said scraper having a driven mechanism thereon, and a drive line shaft universally connected at one end to said driven mechanism, a short shaft having one end universally connected to the other end of said drive line shaft and its other end universally connected to said power take-off, a support for said drive line shaft, said support including upstanding spaced arms on said tongue, a vertical shaft, a first bearing member rotatably mounting said vertical shaft, means mounting said first bearing member on said arms for swinging movement about a horizontal axis, a second bearing member rigidly secured to the upper end of said vertical shaft, means including spaced plates rotatably carried by said second bearing member, a sleeve bearing rigidly mounted between said plates through which said drive line shaft extends whereby a double rotating bearing is provided for said line so that when the tractor is turned said vertical shaft will rock in said first bearing member and about said horizontal axis to allow said short shaft to turn at one-half the angle of the angle of the tractor to said scraper.

8. In combination, a mobile elevating scraper having a tongue and a tractor having a hitch for attachment of the tongue, said tractor having a power take-off, said scraper having hydraulic mechanism operable thereon, said scraper having a conveyor having a transverse shaft at its upper end for moving loosened dirt into said scraper, and a drive line shaft universally connected at its upper end to the transverse shaft on said conveyor, said drive line shaft having a short shaft having one end universally connected to the lower end of said drive line shaft and its other end universally connected to said power take-off, a support for said drive line shaft, said support including upstanding spaced arms on said tongue, a first shaft supported in the upper ends of said arms, a first bearing member for said shaft, a vertical shaft, means securing said vertical shaft to said first bearing member, a second bearing member rigidly secured to the upper end of said vertical shaft, a second shaft in said second bearing, spaced plates rotatably mounted on said second shaft, a sleeve bearing rigidly mounted between said plates through which said drive line shaft extends whereby a double rotating bearing is provided for said line so that when the tractor is turned said vertical shaft will rock on said first shaft to allow said short shaft to turn at one-half the angle of the angle of the tractor to said scraper, a pump mounted on one of said spaced plates in spaced relation to said drive line shaft, means operatively connecting said drive line shaft to said pump to drive same, and means connecting said pump to said hydraulic mechanism whereby said pump supplies fluid pressure thereto.

9. In combination, a two-wheeled scraper and a tractor having a power take-off and a hitch, a frame with an open front dirt collecting box on said frame, said frame having side members and having side walls on said frame and a rear end, axles for said wheels carried by the frame approximately midway of said box, a fixed bottom plate between said side walls spaced from said rear end of the box providing a door opening in the bottom of said box, a door for closing said door opening movably mounted on said side walls, means for moving said door for opening and closing said door opening, a scraper blade extending transversely of the dirt collecting box adjacent the forward edge of said plate, a conveyor mounted on said frame having a transverse shaft at its upper end, said frame side members extending forwardly of said box, a cross member secured to the forward ends of said side members, a tongue, means connecting one end of said tongue to said cross member for rotation relative thereto, the other end of said tongue being pivotally connected to the tractor hitch, means operatively connected to said tongue and frame for tilting said frame to lower said scraper blade to digging position and to raise the same to dirt transporting position, a universally connected telescoping line drive having one end connected to the power take-off of the tractor and its other end to the transverse shaft of said conveyor for rotating said conveyor to move the dirt from the scraper blade into the box, and means on said tongue supporting said telescoping line drive, said means including a bearing member for the line drive, a vertical bearing member, means on said tongue mounting said vertical bearing member for swinging movement about a horizontal axis that is transverse of said tongue, a shaft in said vertical bearing rotatable about the axis thereof, a bearing member rigidly secured to the upper end of said vertical shaft, means including spaced vertically extending plates rotatably mounted in said last-named bearing member with the bearing member on said line drive for the conveyor rigidly secured between said plates whereby when the tractor is turned with respect to the scraper said line drive may move longitudinally with respect to said tongue due to the swinging movement of the vertical bearing member on said horizontal axis.

10. A scraper structure of claim 9 wherein said scraper includes a fluid-operated mechanism, and a pump mounted on one of said spaced plates in spaced relation to said line drive, and means operatively connecting the line drive to the pump to drive same for supplying fluid to said fluid-operated mechanism.

(References on following page)

References Cited in the file of this patent

UNITED STATES PATENTS

| | | |
|---|---|---|
| 1,175,822 | Rowell | Mar. 14, 1916 |
| 1,185,658 | Hagerty | June 6, 1916 |
| 1,858,634 | Maloon | May 17, 1932 |
| 1,926,309 | Pierce | Sept. 12, 1933 |
| 2,106,759 | Paulsen | Feb. 1, 1938 |
| 2,291,858 | Allin | Aug. 4, 1942 |
| 2,348,910 | Kadz | May 16, 1944 |
| 2,421,044 | Vutz | May 24, 1947 |
| 2,597,659 | McCoy | May 20, 1952 |
| 2,700,232 | Eller | Jan. 25, 1955 |
| 2,956,353 | Hanner et al. | Oct. 18, 1960 |